Sept. 12, 1950 J. V. COSTE 2,522,098

RADIO INDICATING APPARATUS

Filed Nov. 13, 1945 2 Sheets-Sheet 1

INVENTOR.
James V. Coste
BY
Harris S. Campbell
ATTORNEY

Sept. 12, 1950 J. V. COSTE 2,522,098

RADIO INDICATING APPARATUS

Filed Nov. 13, 1945 2 Sheets-Sheet 2

INVENTOR.

BY James V. Coste

Harris S. Campbell

ATTORNEY

UNITED STATES PATENT OFFICE 2,522,098

RADIO INDICATING APPARATUS

James V. Coste, Hinton, W. Va.

Application November 13, 1945, Serial No. 628,004

3 Claims. (Cl. 177—311)

This invention relates to radio receivers, and is particularly concerned with the apparatus for indicating the stations being received.

It is an object of the present invention to provide an improved form of indicating device which will operate to show immediately upon tuning in a station, the identification of that station.

Another object of the invention is to provide an improved system and construction for indicating the geographical location and other details associated with the station which is being received.

A further object is to provide means for readily adjusting the radio receiver to select the particular stations which it is desired to have indicated when they are tuned. A simplified selecting mechanism with adjustable contacts is used to allow ready selection of the desired stations.

A more specific object of the invention is the provision of a sectionalized screen, each section representing a radio station which may be indicated with the present apparatus. Upon tuning the stations represented by the different sections, a light shows in the particular section representing the station being tuned, which light projects upon a suitable screen pertinent information relative to that particular station.

It is also an object of the invention to provide for use with short wave radio sets a special global map, which may utilize the indicating apparatus of the present invention to disclose on the map the location of each of certain selected short wave stations when they are tuned in. An indicating light is automatically turned on at the point on the map showing the location of the station being received.

How the foregoing and other objects and advantages of the invention are accomplished will be evident from the following description of the drawings in which.

Figures 1, 2, 3:
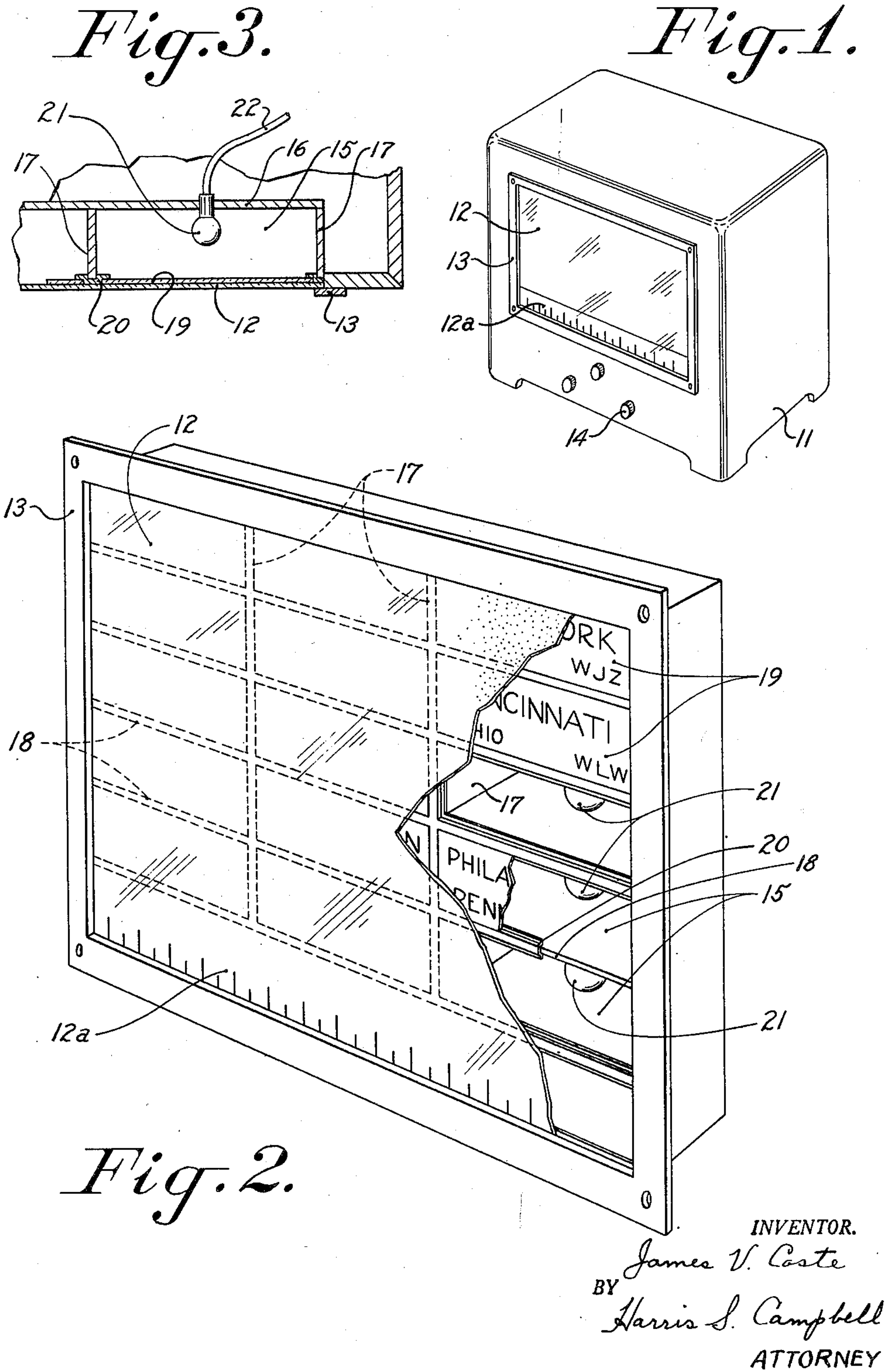
Figure 1 is a perspective view of a radio cabinet incorporating an indicating system according to the present invention.
Figure 2 is an enlarged view of the indicating panel of the radio receiver shown in Figure 1.
Figure 3 is a sectional view taken through one of the compartments of Figure 2.

In Figures 1, 2 and 3 a radio cabinet equipped with an indicating device according to my invention is illustrated. The radio cabinet 11 has a front panel 12 for indicating the stations being received. Panel 12 is preferably a translucent plane surface such as ground glass or suitably prepared plastic sheet, having a frame 13 attaching it to the radio cabinet. A lower portion of the panel, such as is indicated at 12*a* and is more clearly observed in Figure 2, may be marked with a kilocycle scale so that the frequency of the radio station being received may be read by means of a suitable pointer (not shown) but arranged to move behind the panel 12*a* when the tuning knob 14 is turned. Behind the panel 12 are a number of individual compartments 15 formed by means of a rear vertical wall 16, vertical dividing walls 17 and horizontal dividing walls 18. In the front of each compartment 15 directly behind the panel 12 there is a plate member 19 supported in a suitably shaped edge frame as indicated at 20. Plate member 19 is preferably made of transparent material on which is printed the pertinent information concerning the radio station which is to be indicated by each compartment. A small light bulb 21 and an electrical lead 22 is supplied for each compartment.

From the foregoing description of the panel construction and assembly it will be observed that the individual plates 19 may be easily placed in position by removing the frame 13. The panel 12 may then be removed and the plates 19 set in their frames 20. When the panel 12 is replaced the plates 19 are retained securely.

Figures 4, 5, 6, 7, 8, 9:
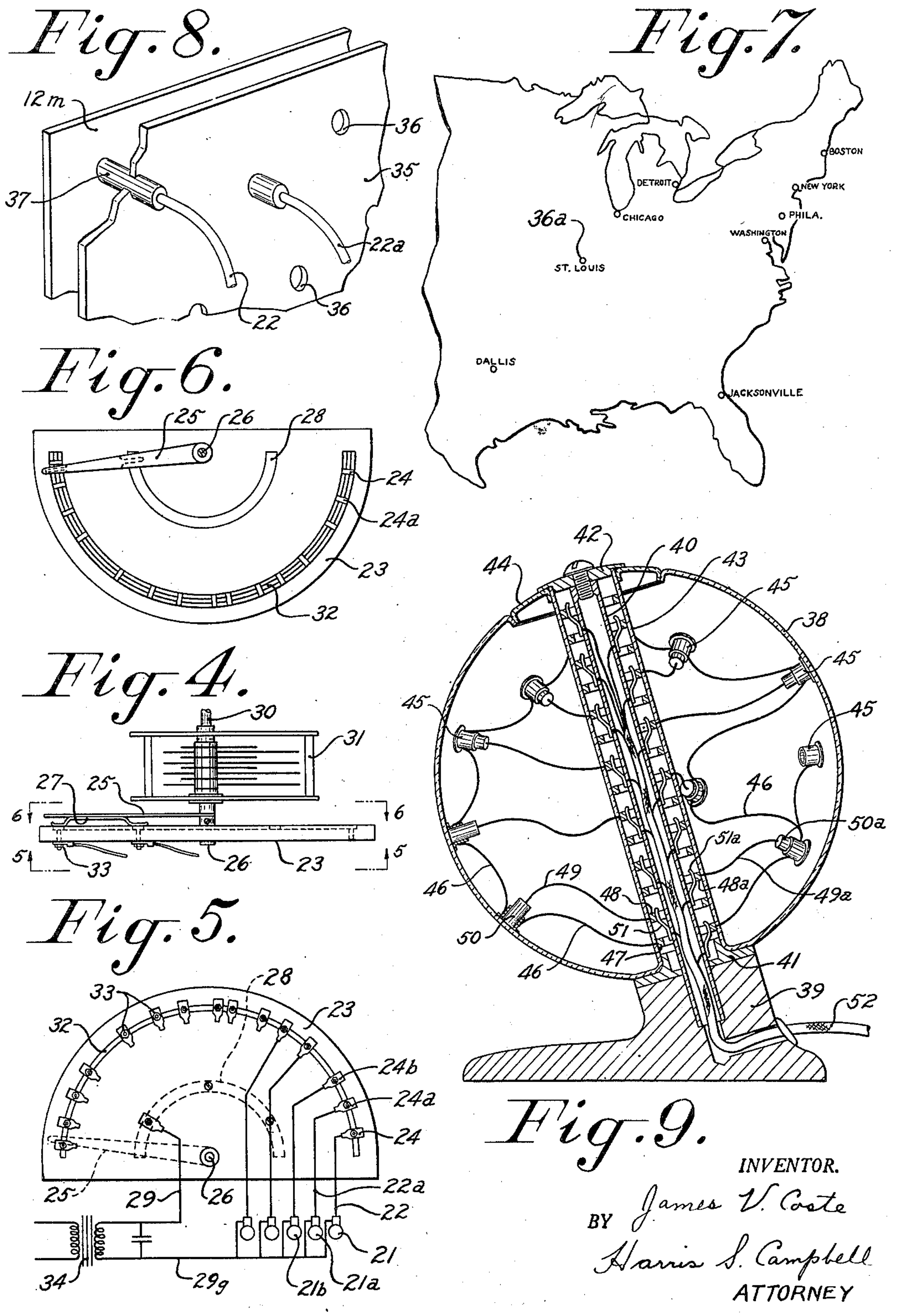
Figure 4 is a plan view of a selector contact unit illustrating its relationship to the variable condenser shaft.
Figure 5 is a rear view of the selector contact unit taken in the direction of arrows 5—5, Figure 4, showing the adjustment details and also indicating the wiring diagram for the electrical circuit.
Figure 6 is a front view of the selector contact unit taken in the direction of arrows 6—6, Figure 4.
Figure 7 is an outline of a portion of a typical map for use with an alternative type of indicating panel.
Figure 8 is a rear perspective view of a portion of the panel used to display the map indicated in Figure 7.
Figure 9 is a sectional view illustrating another form of station indicator unit according to the present invention which utilizes a special geographical globe.

Figures 4, 5 and 6 illustrate the apparatus for controlling the lighting of the electric light bulbs 21. A contact panel 23 is provided with a series of electrical contacts 24, 24*a*, 24*b*, etc. The corresponding electric leads 22, 22*a*, etc. connect the contacts with the various light bulbs 21, 21*a*, etc. An arm 25 of insulating material may be rotated about shaft 26 and is equipped with electrical contact bar 27. The outer end of contact bar 27 makes contact with elements 24, 24*a*, etc. The inner end of contact bar 27 contacts a continuous metallic arcuate strip 28 which is attached to the panel 23. An electrical lead 29 is attached to the metal strip 28 and serves to complete the circuits for the various contacts 24, 24*a*.

The shaft 26 is attached to and rotates with shaft 30 which operates the variable condenser unit 31. Rotation of shaft 30 is caused when the tuning knob 14 is turned. By this mechanism the various circuits represented by the different contacts 24, 24*a*, etc., may be completed, one at a time, as the shaft 26 is rotated during operation of turning the variable condenser for tuning purposes.

It will be seen that the various contacts 24 and 24*a* are supported in an arcuate slot 32. By means of this slot the contacts may be moved to various positions in any irregular manner as illustrated. A small nut 33 is provided at each contact which when tightened retains the contact securely in the position to which it is set. It will be noted that in Figure 6 the contacts are narrow in shape as also are the contacting ends of the movable contact strip 27. By this construction the circuit is completed to cause lighting of the lamp 21 only when the corresponding station is accurately tuned. A transformer 34 is illustrated in Figure 5 which provides electrical current at the proper voltage for use with lamps 21, 21*a*, etc.

The radio receiver may be set up either by the dealer or the owner to suit the particular territory where it is to be used. The most desired or most frequently used stations are selected to be shown by the indicator lights on the map. To select these stations the various contacts 24, 24*a*, etc., are moved into position individually. This may be most readily accomplished by starting at the low frequency end of the scale and selecting the first station desired to be indicated. The station is then carefully tuned and the first contact 24 moved into registering position to light the corresponding bulb 21. The nut 33 is then tightened to retain contact 24 in this position. The next desired station is tuned in and contact 24*a* adjusted similarly. This operation is repeated until all preselected stations are set up. The proper transparent cards showing the station information are selected to correspond to the stations for which the circuits were adjusted. Each card is placed in the front of the proper compartment and the panel 12 replaced. The apparatus is then ready for use.

Figures 7 and 8 illustrate an alternative form of indicating panel. On the translucent panel 12*m* there is provided a map such as, for example, a map of the United States, a portion of which is indicated in Figure 7. On this map are indicated by means of circles the various locations of radio stations. Instead of the individual compartments shown in Figure 2, a wall 35 is mounted behind the panel 12*m*. Wall 35 is provided with circular openings 36 which are located to register with the circles 36*a* on the map on panel 12*m*. A small light bulb which may be covered by a cylinder 37 provides a unit adapted to fit into any one of the openings 36 so that the forward end of the cylinder 37 rests against the translucent panel 12*m*. Alternatively, the light bulb itself may be made in the form of a cylinder, the sides being suitably treated to prevent light from being transmitted. Electrical leads which may also be represented by numerals 22, 22*a*, etc., lead to the various adjustable contacts on the unit 23. The cylinder cover 37 for the light produces a sharply defined circle of light on the panel 12*m* when any of the indicating circuits are completed. The wall 35 may be used as the ground connection means for completing the light circuits, if desired, being part of the circuit indicated in Figure 5 by numerals 29 and 29*g*.

The form of invention illustrated in Figures 7 and 8 utilizes the same contactor unit illustrated in Figures 4, 5 and 6. The circuits are adjusted to receive the desired preselected stations according to locality or choice of the owner in the same general manner as that described above in connection with the first form of the invention. The contacts 24, 24*a*, etc., are adjusted by tuning the desired stations, beginning at the low frequency end of the scale. When the contact 24 has been adjusted, the bulb holder 37 which holds bulb 21 is inserted in the proper hole 36 corresponding to the station selected at position 24. Similarly the bulb holder corresponding to light 21*a* is inserted in the hole on the map corresponding to the station selected at position 24*a*. The other contacts and lights are adjusted in the same manner. In this fashion when a preselected station, which may be located for example in Detroit, is tuned a sharply defined spot of light appears at the Detroit location on the map.

Figure 9 illustrates a form of the invention which is particularly desirable for use with short wave sets to indicate the position of stations which may be received from any part of the world. The geographical globe 38 which is illustrated in sectional view to show the interior is preferably made of translucent material on which a map of the world is shown. A base 39 is provided for mounting and supporting the globe. The central axle member 40 is supported in the base 39 and serves as the rotational axle for the globe 38. The globe 38 is mounted for rotation about axle 40 by means of bearings 41 and 42 on the lower and upper end of the axle respectively. A cylindrical member 43 attached to the globe 38 forms the external rotating axle for the unit. At the upper end of the globe a cover part 44 is removable and forms a means of access to the inside of the globe for adjusting the indicating lights as will be described later. Sockets 45 are provided at the various locations on the globe corresponding to the locations of radio transmitting stations. Each of these sockets 45 is provided with an electrical lead 46 which extends to a ring 47 at the lower end of the rotating axle member 43. Other rings 48, 48*a*, etc., are provided for attachment of individual electrical leads 49, 49*a* which are associated with light bulb members 50, 50*a*. Each ring 48, 48*a*, etc., is contacted by a spring element 51, 51*a*, etc., to provide an electrical contact of the slip ring type, thereby permitting rotation of the globe unit. Each of the contact members 51, 51*a* is attached to an individual wire lead which corresponds to the leads shown in Figure 5 as 22, 22*a*, etc. In the case of the globe arrangement all of the leads 22, 22*a*, etc. are mounted together in a single cord indicated as 52 in Figure 9. This permits flexibility in locating the globe indicator unit either on top of the radio cabinet or remote therefrom, as desired.

This unit may be set up in a fashion generally similar to that described for the form of invention shown in Figures 7 and 8. The light unit 50 which is connected through ring 48 and contact 51 with lead 22 lights when contact 24 is touched by contactor member 27. The radio station corresponding to this position is shown on the map of the world and light bulb 50 is inserted in the socket corresponding to this location. Similarly other lights corresponding to contacts 24*a*, 24*b*, are inserted in their proper locations on the globe. This is done either by inserting the hand through the hole provided by cover 44 or by inserting a suitable instrument in case the globe is of small size. The light unit 50 is preferably made to restrict the light in all directions except in the circle at the end of the light next to the globe's surface. In this way a sharply defined circle of light at the proper point on the globe is formed when the station is tuned.

From the foregoing description of my invention it will be seen that I have provided a simple and versatile method for pre-selecting and indicating various radio transmitting stations by means of suitable indicator lights. It will be obvious, of course, that my invention may be readily applied to sets which use various automatic tuning controls, such for example, the push button type. Any method of rotating the condenser unit into tuned position for one of the preselected stations will cause proper operation of the contactor panel to light the corresponding indicator light. By my construction of the contactor unit adjustment may be made quickly and set securely against accidental change. The indicating device provides a means for quickly and accurately showing the location of the transmitting station. It will also be evident that my improved apparatus can be used at a location remote from the receiving set proper.

I claim:

1. For a radio receiver, a geographical station indicating system including a geographical globe rotatably mounted on an axis structure, a plurality of light sockets each mounted inside said globe at a location corresponding to the position of a radio station, a plurality of light bulbs, a circuit for each bulb including a sliding contact.

2. A radio receiver station indicator including a geographical globe rotatably mounted on an axis, a fixed axis member and a rotatable axis member, a plurality of light sockets attached to the inside surface of said globe at positions corresponding to the geographical location of radio stations, each of said sockets being connected to a ground, a plurality of light bulbs of fewer number than the number of said sockets which may be inserted into selected sockets, an electrical lead to each light bulb including a contact element attached to said fixed axis member and a contact element attached to said rotatable axis member.

3. For a radio receiver, a geographical station indicator system including a geographical globe, means for supporting said globe for rotation, said means including a fixed internal axle member and an external rotatable axle member on which said globe is supported, a plurality of light bulbs which may be supported at selected positions on the inside surface of the globe to show the location of selected radio stations, an electrical circuit for each light bulb including a slip ring mounted on one of said axle members, and a contact element mounted on the other of said axle members in position to contact said slip ring.

JAMES V. COSTE.

REFERENCES CITED

The following references are of record in the file of this patent:

UNITED STATES PATENTS

| Number | Name | Date |
|---|---|---|
| 1,190,115 | Compton | July 4, 1916 |
| 1,658,516 | Daine | Feb. 7, 1928 |
| 1,693,892 | Fuchs, Jr. | Dec. 4, 1928 |
| 1,912,263 | Del Sonno | May 30, 1933 |
| 1,989,237 | Lilly et al. | Jan. 29, 1935 |
| 2,417,043 | Blewett et al. | Mar. 11, 1947 |
| 2,434,250 | Rebus | Jan. 13, 1948 |